Jan. 29, 1963  E. R. SPEAKMAN  3,075,234
SEALED HINGE
Filed April 29, 1960
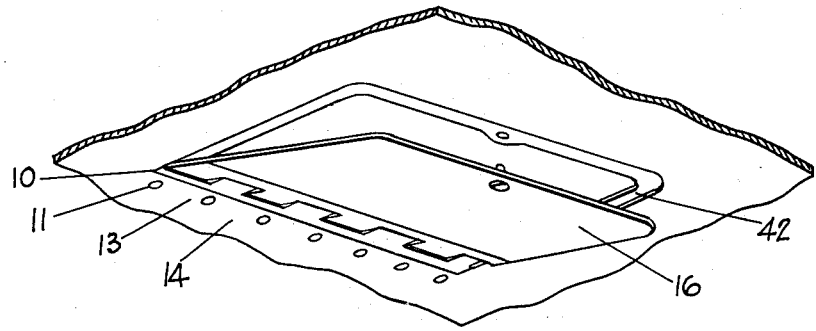
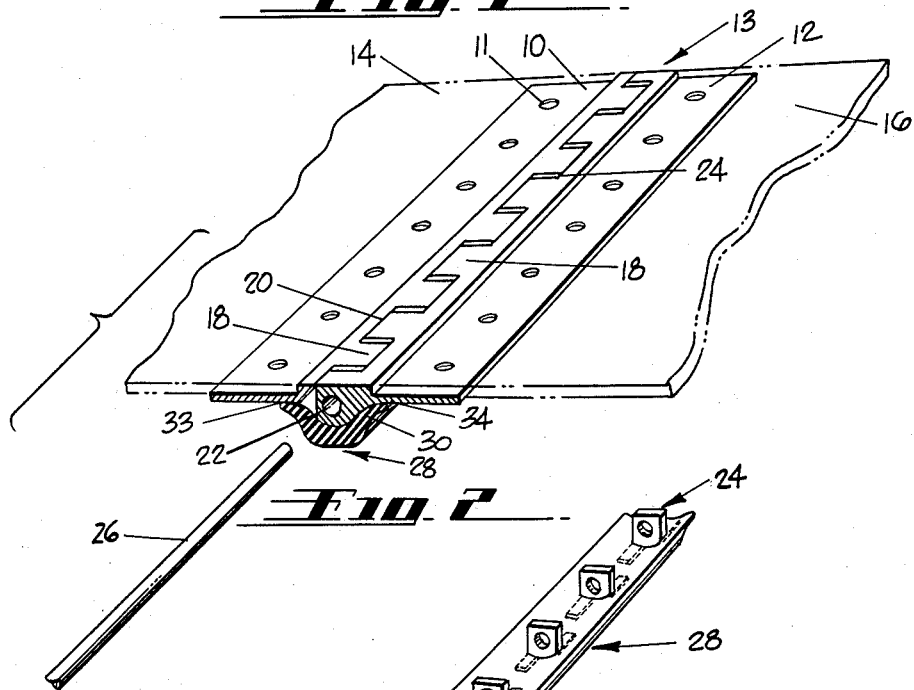
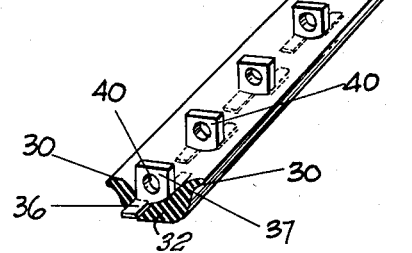
INVENTOR.
EUGENE R. SPEAKMAN
BY
Edwin Coates
-ATTORNEY-

3,075,234
SEALED HINGE
Eugene R. Speakman, Venice, Calif., assignor to Douglas Aircraft Company, Inc., Santa Monica, Calif.
Filed Apr. 29, 1960, Ser. No. 25,743
5 Claims. (Cl. 16—137)

This invention relates to hinge seals and more particularly to constructions wherein the hinge assembly is associated with a flexible seal.

During the flight of an airplane, pressure differentials exist between the air region surrounding the airplane and the compartments of the airplane. This has made necessary the sealing of the access doors located in the exterior aircraft surfaces.

Heretofore, the securing of these doors to the aircraft surface has been done by bolts or other conventional fastening means. The use of these means of attachment resulted from the non-adaptability of commercially available hinges to use on aircraft exterior surfaces. The non-adaptability of available hinges was predicated on the fact that in most hinge mountings, the hinge lobes would project outside the loft line of the aircraft. This projection of the hinge would introduce aerodynamic problems as well as exposing the hinge to damage. In addition, because of the design of these hinges, any sealing means associated therewith would also have to be outside the loft line of the aircraft. Further, the negative pressures that are developed during the flight of an airplane would tend to balloon out a seal when it is located outside the loft line. Another difficulty which has been encountered in the adoption of presently existing seals to aircraft use, is that most seals have one portion of their surface permanently affixed to the structure of the aircraft. This prevented the pressure applied to the seal by the hinge when the door is secured from reaching an equalized condition because the relative movement of the hinge leaves will be absorbed by only the free surface of the seal. In addition, the presently existing hinge seals are of such a configuration, that they interfere with equipment mounted adjacent to the inside of the door during movement of the door.

The present invention provides a hinge seal which has been especially devised to obviate the above noted difficulties. The hinge assembly and seal are so configured that the hinge line lies inward of the loft line of the aircraft, thereby permitting the hinge assembly to be mounted approximately flush with the loft line. In addition, the hinge members and the sealing means can be easily and readily removed from the assemblage; thereby providing a simple way of replacing worn or damaged parts. The location of the seal inwardly of the loft line of the aircraft prevents the seal from being ballooned out by negative pressure conditions because the sealing means is forced against the hinge leaves. In addition, the sealing means of the present invention is not affixed to the hinge but is free to pivot about the hinge pin. This provides an equalizing seal pressure on each hinge leaf, which is not possible where the seal has been permanently affixed to one leaf of the hinge.

The present invention is extremely versatile in its adaptability to various operations, because it can be used wherever a sealed hinge is desired. It is particularly adaptable in operations where objects, materials or substances are continually in contact with the surface of the hinge because of the location of the hinge line. In addition, the present invention displays a high degree of utility in operation where a door and hinge must be continually maintained in a sterile and sanitary condition, because of the easy way in which it can be assembled and disassembled.

Briefly, the hinge seal of the present invention consists of a butt type hinge having mated lobes or knuckles hinged by a pintle, in piano-lid hinge fashion, and a flexible channel-shaped seal or strip having equidistant tabs or clips embedded in it and projecting outward to enable the sealing strip to be pivotally attached to the hinge.

The exact nature of this invention as well as other advantages thereof will be readily apparent from consideration of the following specification relating to the annexed drawings in which:

FIG. 1 is a fragmentary perspective view of an aircraft surface containing an access door showing a typical installation of the invention;

FIG. 2 is a fragmentary perspective view, partly in section, of the preferred embodiment of the invention, inverted with respect to FIG. 1, and showing the hinge pin removed from the apertures along the hinge line; and FIG. 3 is a fragmentary perspective view, partly in section, of the sealing strip, showing the equidistant tabs or clips embedded in the strip.

Referring now to the drawings wherein like reference characters designate like or corresponding parts throughout the several views, there is shown in FIG. 2 one leaf 10 of a butt type hinge 13 mounted to a fixed member 14 such as a door frame or aircraft structure. Adjacent to the first leaf is a second leaf 12 mounted to a movable member 16 such as an access door or the like. Extending from the adjacent surfaces of said leaves 10, 12 are lobes or knuckles 18. On each leaf, adjacent to the lobes on the opposite leaf, is a plurality of recesses 20. Said recesses are of greater longitudinal dimension than said lobes. Circumscribed about the longitudinal axis of said lobes is a plurality of apertures 22. To form the two leaves into the hinge 13, a pintle or pivot pin 26 is inserted into said aperture 22.

Referring to FIG. 3, the sealing strip 28 of the present invention consists of a channel-shaped, flexible, rubber like member having a pair of legs 30, a web 32, and a plurality of equidistant tabs or clips 24 extending outward from said web. The clips 24 each have oppositely directed extensions or feet 36, a projecting portion 37, and longitudinally aligned aperture 40 extending through the projecting portion. The feet 36 of the clips are embedded rigidly in the web 32 of the strip 28 during molding of said strip. The legs 30 of the sealing strip 28 extend outward from the web of the channel at an acute angle with a vertical plane passing through the longitudinal axis of the strip.

As seen best in FIG. 2, the recesses 20 of the hinge leaves 10, 12 are of sufficient width for each to receive adjacent clips 24 of sealing strip 28 and a lobe 18 from the adjacent hinge leaf. Therefore, when the clips 24 have been inserted into said recesses 20, and the lobes 18 have been likewise inserted, the pintle pin 26 is inserted into the apertures 22, 40 in the lobes 18 and clips 24 respectively to form an assemblage of the two hinge leaves, 10, 12 and sealing strip 28. Thereupon the legs 30 of the sealing strip 28 contact the interior surface 33, 34 of the hinge leaves 10, 12 respectively. Said legs 30 project outward sufficiently to provide a line of sealing contact between said strip 28 and the interior surfaces 33, 34 of the hinge leaves 10, 12 respectively when the door is secured.

Referring now to FIG. 1, there is shown a typical access door 16 having a hinge seal 13 mounted along one edge thereof, wherein one leaf 10 of the hinge is attached by conventional means 11 such as rivets, bolts or the like to the adjacent structure or door frame 14 and the other leaf 12 is attached in a similar fashion, to the door 16. The sealing strip 28 (shown in FIG. 2) extends into a channel 42 formed by the structure surrounding the opening. Referring now to FIG. 2, when the door is closed, the force of closure causes the interior surface 34 of the hinge leaf 12 to apply a force against the adjacent leg 30. This results in a rotation of the sealing strip about the hinge line until the force is equalized between both of the legs 30. In this fashion an equalized force is maintained along the line of contact between the hinge leaves and the sealing strip.

The sealing strip 28 can be readily removed from the hinge seal 13 by removal of the pin 26. This provides a simple means of replacing damaged or deteriorated sealing strips. In addition, damaged doors can be replaced and interchanged without drilling out rivets or bolts by simply substituting a door that has been fitted with a mating hinge leaf.

The above description has been offered in relationship to the use of the present invention on aircraft. While the invention has great utility in aviation, it should be pointed out that its use is not limited thereto for it can be used anywhere that a hinge seal is desired.

It should be understood, of course, that the foregoing disclosure relates to only a preferred embodiment of the invention and that numerous modifications or alternatives may be made therein without departing from the spirit and the scope of the invention as set forth in the appended claims.

I claim:

1. A sealed hinge for use with a pair of members to be joined comprising: hinge means for rotation of one member about the other; said means having first and second surfaces, a plurality of lobes, and longitudinally aligned apertures in said lobes, wherein said first surface is in contact with a portion of said pair of members and said lobes project from said second surface to define a hinge line; sealing means for sealing said hinge line, said sealing means being coextensive in length with said hinge means; and attachment means coacting with said sealing means for attachment of said sealing means to said hinge means for rotation about said hinge line, said attachment means including a plurality of equidistant tabs embedded into and projecting from said sealing means into engagement with said hinge means, said tabs having oppositely directed extensions projecting therefrom longitudinally of the hinge line whereby an equalized sealing force is maintained between said sealing means and said hinge means when said hinge means are rotated to the closed position.

2. A sealed hinge for use with a pair of members to be joined, comprising: a hinge means for mounting a first one of said members for rotation about a second one; a rotatable channel shaped flexible sealing strip for sealing the juncture of said first and second members, said sealing strip being coextensive in length with said hinge means; a plurality of equidistant tabs embedded in and projecting from said sealing strip into engagement with said hinge means, said tabs having oppositely directed extensions projecting therefrom longitudinally of the hinge axis whereby an equalized sealing force is maintained between said sealing strip and said hinge means when said hinge means are rotated to the closed position; and a means for attaching said tabs to said hinge means whereby said sealing strip is rotatable about said hinge means.

3. A sealed hinge for use with a pair of members to be joined for closing an opening comprising: a hinge means for mounting a first one of said members for rotation about a second one; a channel shaped flexible sealing strip having a pair of projecting legs, said sealing strip being coextensive in length with said hinge means; and attachment means coacting with said sealing strip for attaching said strip rotatably to said hinge means whereby said hinge means will contact said projecting legs in a line of contact of equalized sealing force only when said opening is closed.

4. A sealed hinge for use with a pair of members to be joined comprising: a pair of hinge leaves having a plurality of lobes and recesses, said lobes having longitudinally aligned apertures, and said recesses being of greater longitudinal dimension than said lobes whereby said lobes are insertable into said recesses; a flexible channel shaped sealing strip having a channel web, said sealing strip being coextensive in length with said hinge leaves; a plurality of equidistant tabs embedded in and projecting from said channel web, said tabs having longitudinally aligned apertures; and a rigid pintle pin engageable with said lobes and tab apertures to form a sealed hinge.

5. In combination with a pair of members to be joined for closing an opening wherein zones of unequal pressure exist on opposite sides of said members: a hinge means for rotation of one member about the other, said means including a plurality of lobes and longitudinally aligned apertures in said lobes wherein said lobes and apertures define a hinge line; a flexible sealing strip associated with said hinge means for sealing said hinge line, said sealing strip being coextensive in length with said hinge means; and attachment means coacting with said sealing strip for attachment of said sealing strip said attachment means including a plurality of equidistant tabs embedded in said strip and projecting therefrom into engagement with said hinge means, said tabs having oppositely directed extensions projecting therefrom longitudinally of the hinge line whereby an equalized sealing force is maintained between said sealing strip and said hinge means when said hinge means are rotated to the closed position thereby preventing said strip from ballooning out by said zones of unequal pressure.

References Cited in the file of this patent

UNITED STATES PATENTS

| | | |
|---|---|---|
| 377,852 | Giesy | Feb. 14, 1888 |
| 1,867,046 | Zinser | July 12, 1932 |
| 2,586,757 | Wummel et al. | Feb. 19, 1952 |